Feb. 1, 1927.　　　　　　　　　　　　　　　　　1,615,965
H. R. STRAIGHT
MECHANISM FOR TRANSFERRING PLASTIC BLOCKS FROM ONE CONVEYER TO ANOTHER
Filed May 22, 1923
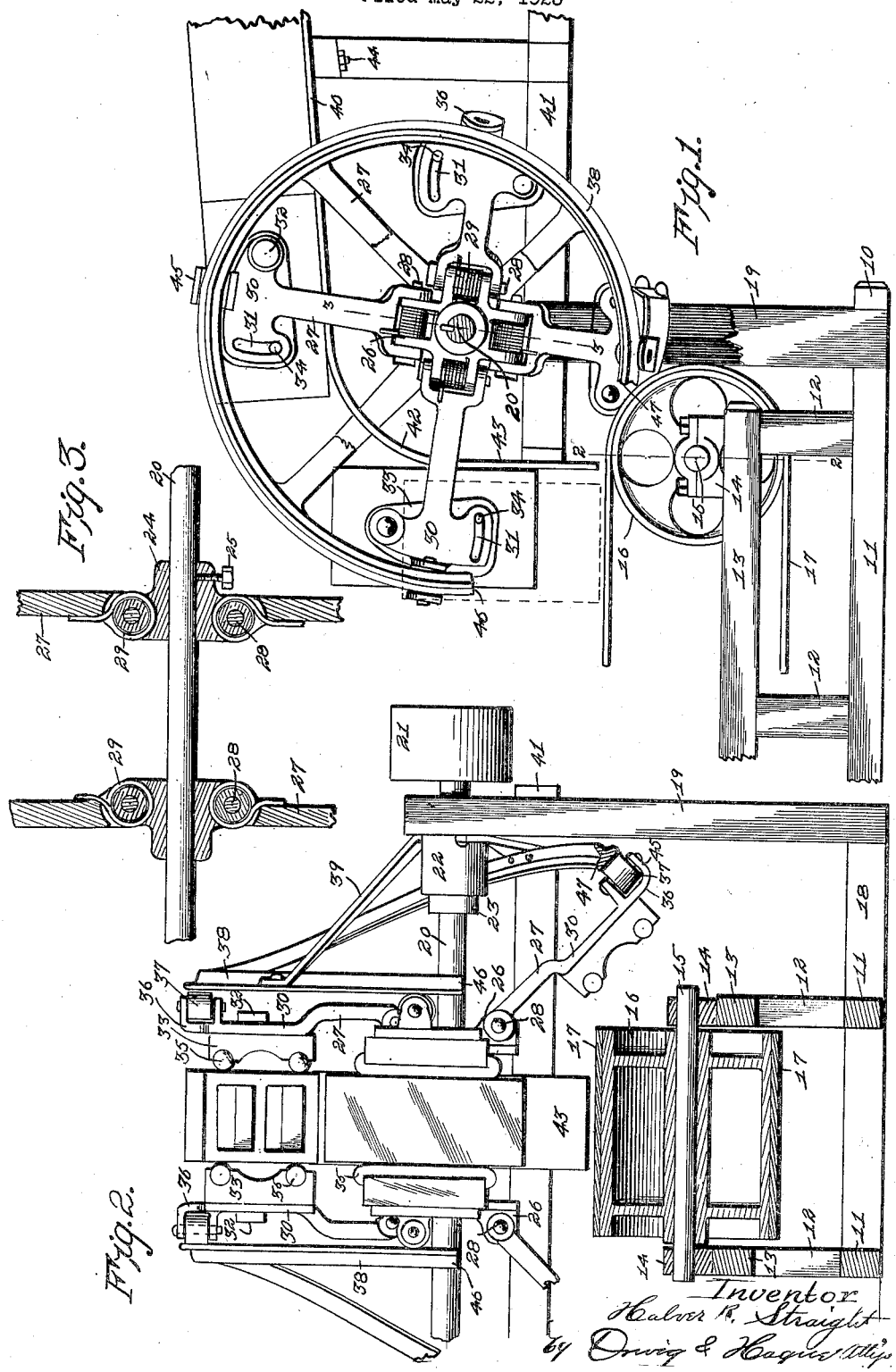
Inventor
Halver R. Straight Patented Feb. 1, 1927.

1,615,965

UNITED STATES PATENT OFFICE.

HALVER R. STRAIGHT, OF ADEL, IOWA.

MECHANISM FOR TRANSFERRING PLASTIC BLOCKS FROM ONE CONVEYER TO ANOTHER.

Application filed May 22, 1923. Serial No. 640,658.

This invention relates to improvements in mechanisms for transferring plastic blocks from a delivery device to a conveyer in substantially a vertical position.

The object of my invention is to provide a mechanism of simple, durable and inexpensive construction which will automatically deliver plastic tile from a delivery chute or conveyer to a second conveyer, the tile being placed on the first conveyer in a horizontal position and end to end, and delivering them to the second conveyer in a vertical position and spaced apart.

A further object is to provide in such a mechanism improved means for transferring the tile from the first conveyer to the second one, the said means being driven continuously and in one direction.

More specifically it is the object of my invention to provide an inclined chute for receiving plastic brick or blocks from the delivery end of a tile cutting machine, and to provide in operative relation with said chute, a conveyer for receiving the tile from the first said chute, and in connection with these, a pair of grippers designed to grip each side of the plastic block and to carry it from a horizontal position from the chute and deliver it to a vertical position on the conveyer, and in connection with the gripping devices means whereby the same may be carried continuously in circular paths in such a manner that the said grippers may be actuated at a large number of speeds and in a continuous manner so as to adapt the machine for high speed work or low speed work, and one which will operate without oscillation or vibration regardless of whether it is running fast or slow.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved mechanism showing a portion of the frame work broken away.

Figure 2 is an end elevation of the same, the second conveyer being taken in section on the line 2—2 of Figure 1.

Figure 3 is an enlarged detail sectional view taken on the line 3—3 of Figure 1.

The numeral 10 indicates a supporting frame which comprises base members 11 and upright members 12. The members 12 are provided with horizontally arranged frame members 13 each end of which is provided with bearing blocks 14, only one of the said bearing blocks being shown.

The blocks 14 are designed to receive a shaft 15 on which a belt pulley 16 is mounted, which is designed to receive a belt conveyer 17 of the ordinary construction and may be driven from any suitable mechanism and at any desired speed.

Adjacent to one end of the members 11 is a cross beam 18, the outer ends of each being provided with an upright 19. The upper ends of the uprights 19 are designed to rotatively receive a shaft 20, one end of which is provided with a drive pulley or other suitable drive mechanism 21.

The shaft 20 is mounted in bearings 22 and provided with collars 23 designed to rest adjacent to the inner faces of the bearings 22 to prevent longitudinal movement of the shaft 20.

The inner portion of the shaft 20 is provided with a pair of hubs 24 secured in position by means of set screws 25 in such a manner that the hubs may be moved toward or from each other. Each of the hubs 24 is provided with a series of radial pivot members 26 arranged in pairs, there being preferably four pairs for each hub. The pairs of one hub are in alinement with those of the opposite hub.

To each pair of the pivot members 26 I have provided a radially extending arm 27 pivotally mounted by means of a pin 28. That portion of the pin 28 that extends between the pivot members 26 is provided with a coil spring 29, one end of which is connected with the arm 27 and the other with the hub 24 in such a manner that the free ends of the arms 27 will be yieldably held outwardly.

The outer end of each of the arms 27 is provided with a plate 30, the plates of opposite sets of arms being substantially parallel with each other. One end of the said plates is provided with a circular slot 31, while the opposite is provided with a pivot member 32 designed to pivotally mount a gripper head 33 adjacent to the inner face of each of the plates 30.

Each of the gripper heads 33 is provided with an outwardly extending pin 34 designed to enter the slot 31. The inner face of each of the heads 33 is provided with gripper members 35 which may be pneumatic or of any pliable material.

The outer edge of each of the plates 30 is provided with a bracket 36 designed to receive a roller 37 designed to travel against tracks 38. The device is provided with two of these tracks, one for each upright member 19, and the said tracks being supported by braces 39, the purpose of which will hereinafter be made clear.

Mounted between the arms 27 and above the shaft 20 and in alinement with the conveyer 17 I have provided what I shall term a delivery chute, which consists of a plate 40 supported by a suitable frame work 41. The upper end of the plate 40 is designed to receive blocks of plastic material from the tile cutting machine in the manner which is in common practice. The blocks are delivered to the said chute on plates in substantially a horizontal position and end to end. The discharge end of the chute is provided with a curved portion 42 which is concentric with the center of the shaft 20 and provided with a downwardly extending portion 43 also supported by the frame 41 and terminates at a point slightly above the conveyer 17, as clearly shown in Figure 1.

It will be seen that the conveyer 17 is considerably below the shaft 20, while the chute 40 is considerably above. The said plate 40 is detachably secured to the frame by means of bolts 44, and is of a width substantially equal to the width of the blocks, while the conveyer 17 is one which is permanently mounted and of a width considerably greater than the width of the blocks.

It will be understood that machines of this class must be designed to handle blocks of various widths, inasmuch as the same tile cutting machines and the tile machine itself are designed to produce blocks of different widths. The conveyer 17 is often of a considerable length and it is not convenient to change the conveyer to accommodate different width blocks. It will be seen that the plate 40 may be easily and quickly detached by simply removing the bolts 44 and any width plate substituted.

The gripper heads 33 are also detachably secured to the pivots 32 in such a manner that blocks of various widths may be accommodated by simply substituting gripper heads of different thicknesses.

The tracks 38 are so arranged that from the points 45 to the points 46 the tracks are circular and parallel with each other, while from the points 47 to the points 45 the tracks are eccentric respective to the center of the shaft 20 and arranged in a converging manner from the points 47 to the points 45 with respect to each other in such a manner that if the plastic blocks are moved longitudinally on and toward the discharge end of the plate 40 and that the shaft 20 is rotated in an anti-counterclockwise direction, as shown in Figure 1, the center of the gripper heads will travel in a circular path at a speed equal to the linear speed of the plastic blocks as they travel on the plate 40.

It will be seen that the tracks 38 may be spaced apart such a distance that when the gripper heads are moved to the position as shown by the upper one in Figure 1, where the gripper heads are opposite the side faces of the central portion of the end block, the rollers 37 will engage the inner face of the track 38 in such a manner that the grippers 35 at this point will engage the outer face of the block with sufficient pressure that the weight of the block may be sustained by said grippers.

A further continuation of the movement of the gripper heads will cause a slight rotary or sliding movement between the plates 30 and the outer face of the gripper heads due to the angularity of the movement between the blocks and the gripper heads. This prevents the gripper members 35 from being moved relative to the face of the block, which in some cases would be marred by such movement. The rotary movement of the heads 33 is continued until the blocks assume a substantially vertical position, as shown by the left hand head member in Figure 1.

The pivot members 32 are so located that when the blocks assume this position, the said pivot members will be above the center of gravity of the block and the lower end of said block is swung downwardly, and the said block will be maintained in a substantially vertical position. The rotation will be continued until the lower edge of the block reaches a point slightly above the upper run of the conveyer 17, at which time the rollers 37 will disengage the free end of the track 38 and the free ends of the arms 27 will be swung outwardly from each other by means of the springs 29, and carrying with them the gripper heads 33, at which point the block is released and permitted to rest on the upper run of the conveyer 17.

The conveyer 17 is driven continuously and at such a speed that the blocks when placed thereon will be spaced a slight distance apart. When the block has reached the vertical position, as shown in solid lines in Figure 1, it will be moved outwardly and downwardly from the center of the shaft 20 to the position shown in dotted lines. It will be seen that this outward movement is in the same direction in which the upper run of the conveyer belt 17 is traveling, and a certain amount of advance movement of the block is produced before it actually engages the upper run of said conveyer. This movement is sufficient to prevent a comparatively small block from being upset by the inertia of its upper end at the time the lower end engages the upper run of the conveyer.

When the rollers 37 disengage the free ends of the tracks 38, they will be thrown outwardly against the opposite end of the track near the point 47 to clear the outer edge of the conveyer 17, and as the shaft 20 is continued in its rotation, the heads will be moved toward each other, due to the track being arranged in a spiral or converging manner, until they have reached the points 45 where they will again engage the outer faces of the blocks.

By providing four of the heads 33 on each of the hubs 24 it will be seen that when the block carried by said heads has reached the vertical position, the supporting arm will be in substantially a horizontal position, and the weight of the said block will aid the movement of the head members as the rollers 37 approach the points 45, and the grippers moved to engagement with the blocks in such a manner that a very little amount of power is necessary from the rotation of the shaft 20.

By this arrangement it will be seen that I have provided a mechanism for transferring blocks from a delivery conveyer or chute to a receiving conveyer of simple, durable and inexpensive construction, and one which may be operated continuously and at a uniform speed with a minimum amount of power, and one in which substantially all reciprocating and oscillating movements are eliminated, and which may be easily and quickly adapted to operate on blocks of various thicknesses.

I claim as my invention:

1. In a device of the class described, a frame, a delivery chute, a receiving conveyer, means for successively transferring blocks from the delivery chute to the receiving conveyer from a substantially horizontal position to a substantially vertical position comprising a pair of spaced grippers, means for supporting and carrying said grippers in continuous rotary paths about a common center, means for simultaneously moving said grippers toward each other as they are being rotated, and means for moving said grippers simultaneously from each other at predetermined points of their movement, for the purposes stated.

2. In a device of the class described, a supporting frame, a delivery chute for receiving plastic blocks from the tile cutting machine in a substantially horizontal position and end to end, a receiving conveyer below the discharge end of said delivery chute and in alinement therewith, a shaft supported transversely to said chute and substantially midway between the delivery end of said chute and the receiving end of said conveyer, a pair of hubs spaced apart on said shaft, an arm pivoted to each of said hubs to swing in a common plane with said shaft, a gripper head pivotally mounted on the outer end of each of said arms, means for rotating said shaft and moving said heads in a circular path about said shaft, means for moving the two heads simultaneously toward each other as they are being rotated to a position where they will engage the opposite side faces of a block on said delivery chute and be operated in parallel relation with each other to a point where the block will assume a vertical position with its lower end adjacent to said receiving conveyer, and means for releasing the said gripper heads and swinging them outwardly to disengage said block.

3. A supporting frame, a delivery chute, a receiving conveyer, a shaft rotatively mounted transversely to the movement of said conveyer, pivoted arms carried by said shaft, a gripper head pivotally mounted to the free end of each of said arms, a roller on the outer end of each of said gripper arms, a pair of spaced tracks for said rollers, a portion of each of which is concentric with said shaft, said concentric portions being parallel to each other, portions of said tracks being eccentric with said shaft having the said eccentric portions placed in a diverging manner with each other in such a manner that as the said shaft is rotated the gripper heads will be moved first in a circular path and in parallel planes, and thence moved outwardly from each other and gradually inwardly toward each other to their original position.

4. In a device of the class described, a support, a shaft rotatively mounted therein, a pair of radial arms for said shaft, each of said arms having its inner end pivoted adjacent to said shaft, a gripper member for the outer end of each of said arms, means for rotating said shaft, means for yieldably moving the free end of said arms from each other, means for moving the free end of said arms towards each other as the shaft is rotated through a portion of its circular movement, and means for maintaining and moving the said gripper members in spaced parallel relation with each other through another portion of their circular movement.

5. A support, a shaft rotatively mounted therein, a pair of hubs on said shaft, a series of radial arms pivotally mounted to each of said hubs, said arms being designed to swing in planes common to said shaft, a gripper member for the outer end of each of said arms, means for rotating said shaft, means for moving said gripper members simultaneously toward each other, through a certain portion of their movement, means for maintaining the said gripper members in spaced parallel relation with each other through other portions of their movement, and means for quickly moving the arms to their outer limit of movement.

6. In a device of the class described, a supporting frame, a delivery chute for receiving plastic blocks from a tile cutting machine, arranged in systematic manner, a receiving conveyer below the discharge end of said delivery chute and in alinement therewith, a series of gripping members arranged in pairs and oppositely disposed, means for rotating each pair of grippers about a common center, means for causing one of the grippers of each pair to travel in a path parallel to the path of the opposite gripper, means for causing said grippers to suddenly move outwardly from each other then to move gradually toward each other, means for synchronizing each pair of grippers with a given one of the blocks of said delivery chute, the grippers being designed to engage the blocks while on said delivery chute and to place them in position on said receiving conveyer and to turn them while being delivered through an angle of ninety degrees.

7. In a device of the class described, a supporting frame, a delivery chute for receiving plastic blocks from a tile cutting machine, a receiving conveyer below the discharge end of said delivery chute and in alinement therewith, continuously rotating gripping means for actuating on the side faces of said blocks for receiving said blocks and said delivery chute and delivering them to said receiving conveyer and turning them from a substantially horizontal position to a substantially vertical position.

Des Moines, Iowa, May 8, 1923.

HALVER R. STRAIGHT.